R. B. VAUGHAN AND R. M. LOVE.
STORAGE HOUSE AERATING SYSTEM.
APPLICATION FILED FEB. 2, 1920.
1,365,571. Patented Jan. 11, 1921.
2 SHEETS—SHEET 1.
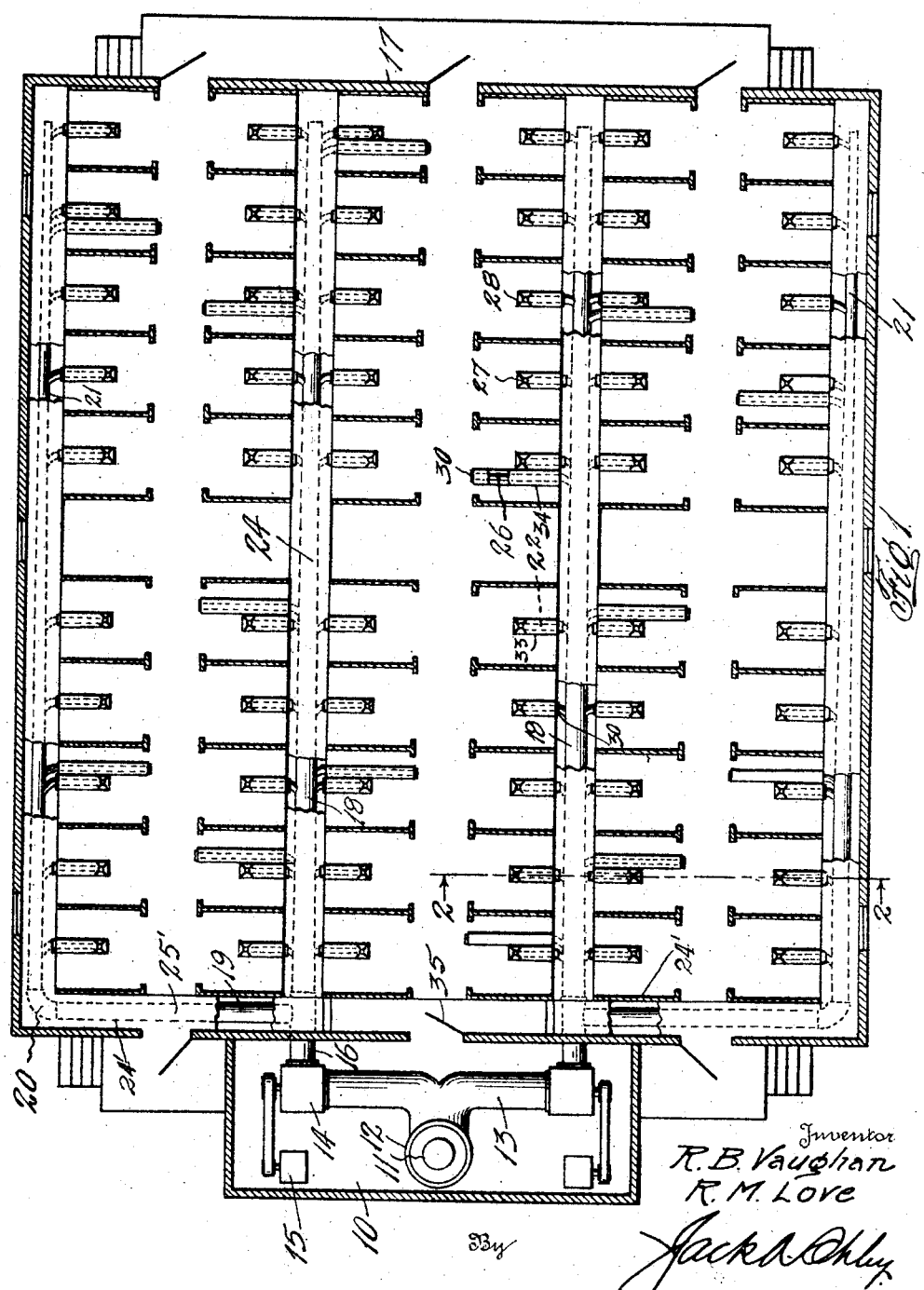

R. B. VAUGHAN AND R. M. LOVE.
STORAGE HOUSE AERATING SYSTEM.
APPLICATION FILED FEB. 2, 1920.
1,365,571.
Patented Jan. 11, 1921
2 SHEETS—SHEET 2.
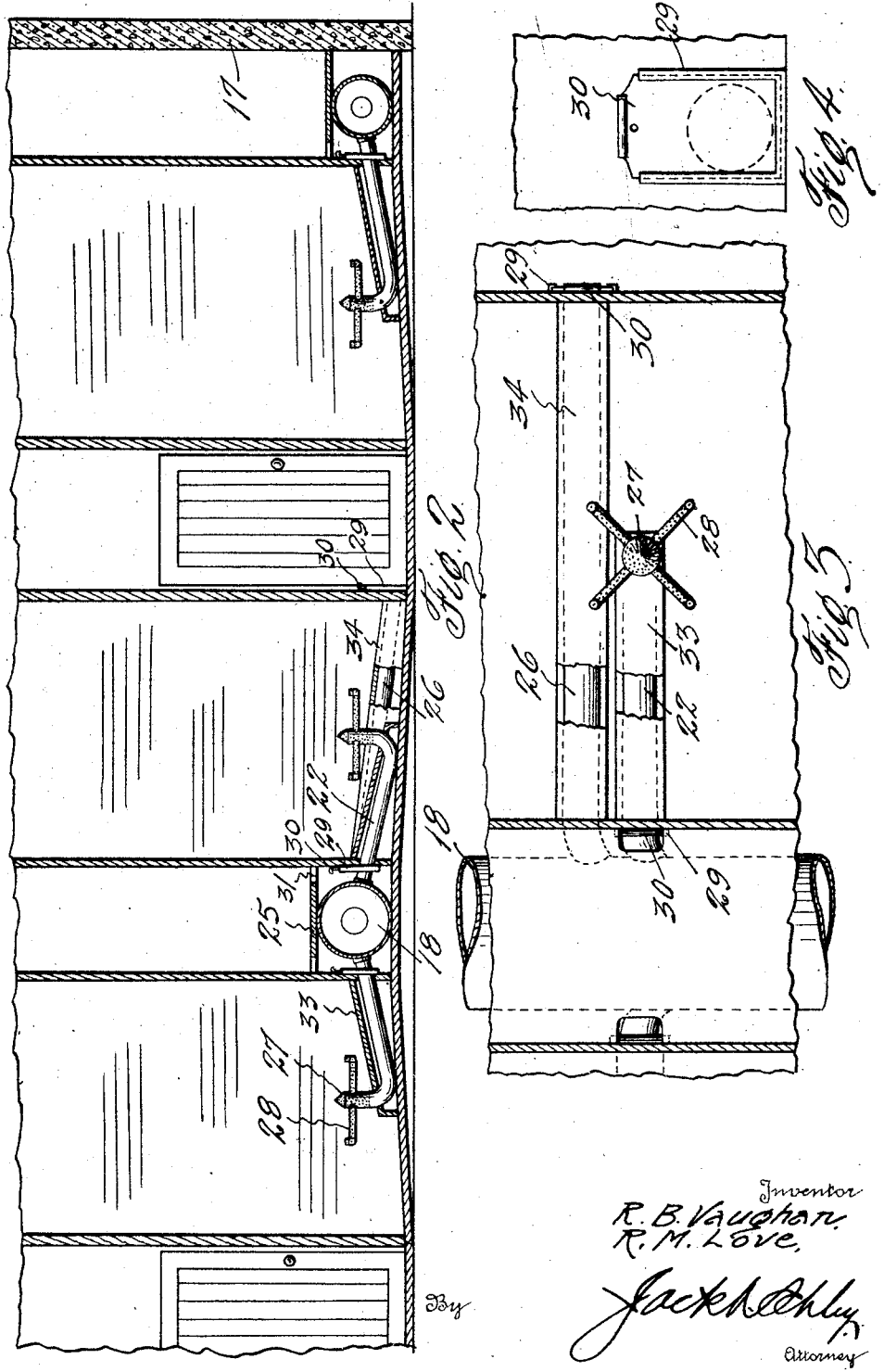

UNITED STATES PATENT OFFICE.

ROBERT B. VAUGHAN AND RALPH M. LOVE, OF DALLAS, TEXAS.

STORAGE-HOUSE AERATING SYSTEM.

1,365,571. Specification of Letters Patent. Patented Jan. 11, 1921.

Application filed February 2, 1920. Serial No. 355,610.

*To all whom it may concern:*

Be it known that we, ROBERT B. VAUGHAN and RALPH M. LOVE, citizens of the United States, residing at Dallas, in the county of Dallas and State of Texas, have invented certain new and useful Improvements in Storage-House Aerating Systems, of which the following is a specification.

This invention relates to new and useful improvements in curing house aerating systems.

It has been customary to supply tempered air to the bin in which the vegetables are stored either from an air compressor or a blast fan. It has been found that where air is supplied from a blast fan and through a reasonably large duct that it was impossible to obtain an equal distribution as a greater volume of air was distributed in some bins than in others. The aim of this invention is to obtain an equal distribution of the tempered air and to deliver to each bin irrespective of its location substantially the same volume of air. It is also sought to obtain an equal distribution of the tempered air throughout the entire building as well as in the individual bins.

In carrying out the invention a main duct or conduit decreasing in diameter from its supply end to its opposite end is connected with a source for supplying tempered air. Lateral conduits lead from the main conduit into each bin and branch conduits lead from the main conduit through the bins to the aisle for supplying air to the latter. In each bin a distributing nozzle is connected with the end of the lateral conduit. Valves are arranged for controlling the passage of air to or from the lateral or branch conduits as the case may be.

One of the very important features of this invention is the arrangement of the entire system above the floor of the curing house whereby free access may be had to all of the parts. Another point is the arrangement of the main conduit in an alley way or passage behind the bins so that access may be had to the lateral conduit leading to any bin without entering said bin and the valve thereof controlled. It has been customary to arrange these systems under the floor of the house and the controlling valve for each bin has also been under the floor so that the attendant could not always ascertain whether or not the valve was closed or open. By arranging the valve on top of the floor and at a point at which it is readily accessible a decided advantage is had.

The invention will be more readily understood from a reading of the following specification and by reference to the accompanying drawings, in which an example of the invention is shown, and wherein:

Figure 1 shows a plan view of a curing house equipped with a system constructed in accordance with this invention, Fig. 2 is a transverse vertical sectional view on the line 2—2 of Fig. 1, Fig. 3 is a detail in plan showing one of the lateral conduits and one of the aisle warming conduits and component parts, and Fig. 4 is a detail in elevation of one of the valves.

In the drawings the numeral 10 designates a furnace or heating room in which a heating furnace 11 is arranged and provided with an air jacket 12. Air is supplied to this jacket in a suitable manner and a manifold 13 leads from the jacket. At each end the manifold enters a blast fan 14 driven by a motor 15. From each blast fan a discharge pipe 16 leads. Each pipe 16 passes through the wall of the main curing house 17. As the apparatus connected with each pipe 16 is substantially the same a description of one will suffice for both. From the end of the pipe 16 a conduit 18 extends the full length of the curing house 17. This main conduit gradually decreases in diameter from its point of connection to the pipe 16 to its opposite end. This causes the pipe to taper and it is obvious that a less volume of air is required to fill the small end of the pipe than is required to fill the large end. A branch conduit 19 leads laterally from the pipe 16 and is connected with a side conduit 21 parallel to the conduit 18. The conduit 21 is also tapered and it is pointed out that all of the conduits are constructed so as to be equalized in the distribution of air.

From the conduits 18 and 21 lateral conduits or pipes 22 extend entering each bin through the rear wall thereof. It will be noticed that the conduits 18 and 21 extend along the back of the bins in alley-ways 24 and are covered by platforms 25. The transverse portions 19 of the conduits 21 are also in alley-ways 24' covered by platforms 25'. Periodically branch conduits 26 lead from the conduits 18 and 21 through the bins and terminate at the front thereof for the purpose of supplying air to the aisles between the bins. It will be seen that the main conduit is between two rows of bins while the side conduit 21 is between the wall of the building and one row of bins and further that the arrangement of the conduit could be varied in accordance with the construction of the building, but the main feature is that the conduits are in the rear of the bins and are readily accessible. Each lateral conduit 22 has its inner end bent upward to form a standard 27 of a nozzle at the center of the bin. The standard is perforated and has arms 28 which may have their ends turned up.

It is obvious that the particular construction of the nozzle may be varied and forms no essential part of the invention. In each pipe 22 a valve is arranged and consists of a guide frame 29 and a side valve 30 which latter is mounted to slide vertically in the frame and when pushed downward obstructs the passage of air through the conduits and when pulled upward permits a free passage of the air. We prefer to locate the valve in the pipes 22 between the conduits and the rear wall of the bins. By making holes 31 in the platform, the attendant can readily reach down and grasp the valve 30 so that the latter is under his control and he may know positively whether it is open or closed. Similar valves are arranged at the end of the conduits 26 and are placed in the aisle on the front of the bins so that they are readily accessible. By arranging the entire system on top of the floor of the house and placing the valves where they can be seen and freely operated a distinct advantage and improvement is had, and a large portion of the trouble heretofore encountered is eliminated.

The conduits 22 are covered by housings or boxes 33 and likewise the conduits 26 are covered by similar structures 34. These housings 33 and 34 are of course only located in the bins and their purpose is to protect the conduits from the weight of the vegetables which are stored in the bins thereover. It is obvious that a curing house could be built with a single row of bins and one conduit with the bin supply and aisle supply conduits leading therefrom, and the number of the conduits will depend upon the capacity of the curing house. There is a distinct advantage had by taking the heated air directly from around the furnace and delivering the same to the blast fan and then expelling this air direct into the conduit from which it is distributed through the bins. A door 35 leads from the furnace room 10 to the curing house proper and warm air may be allowed to escape through this door and through additional openings if necessary. It has been the practice to place stoves in the aisles of curing houses during severe cold spells which is a haphazard method and involves a high fire risk. By means of the aisle warming conduits 26 an even temperature may be maintained throughout the house outside of the bins. By arranging the entire system on top of the floor all of the heat radiated is utilized in the building whereas if the heating conduits were under the floor a certain amount of the heat would be lost. It is, of course, understood that the conduit 19 and the conduit 21 in each instance would have to be less in diameter in proportion than the main conduit 18 in order to obtain an equal distribution.

What we claim, is:

1. In apparatus of the character described, a house having a floor, a set of bins in the house above the floor disposed to form a passage above the floor and upon one side of said bins, said floor being common to the bins and the passage, an air conduit in the passage above said floor, a platform arranged within the passage over said air conduit and having openings, discharge pipes leading into the bins from said conduit, and valves in the discharge pipes and arranged near said openings.

2. In apparatus of the character described, a house having a floor, a row of bins in the house above the floor, and disposed to form an alley-way above the floor upon one side of said row of bins and an aisle upon the opposite side of said row above the floor, said floor being common to the bins, alley-way and aisle, an air conduit in the alley-way above said floor, a platform arranged over said air conduit and having openings, discharge pipes leading into the bins from said air conduit, aisle warming pipes discharging into the aisle and connected with said air conduit, and valves in the discharge pipes and arranged near said openings, and means to supply tempered air to the air conduit.

3. In apparatus of the character described, a house having a floor, a row of bins in the house above the floor disposed to form an alley-way upon one side of the row and an aisle upon the opposite side, said floor being common to the bins, alley-way, and aisle, an air conduit extending longitudinally within the alley-way and arranged above the floor, a platform above the conduit, discharge pipes leading into the bins from said air conduit, valves in the discharge pipes and being accessible within the alley-way, aisle warming pipes discharging into the aisle and connected with the air conduit, valves in the aisle warming pipes, and means to force tempered air into the air conduit.

4. In apparatus of the character described, a house having a floor, a group of bins in the house above the floor, disposed to form an alley-way upon one side of the group and an aisle upon the opposite side, said floor being common to the bins, alley-way, and aisle, an air conduit extending longitudinally within the alley-way and arranged above the floor, a platform disposed above the air conduit, discharge pipes leading into the bins and connected with said air conduit and arranged above said floor, and valves in said discharge pipes and being accessible within said alley-way.

5. In apparatus of the character described, a house having a floor, a group of bins in the house above the floor, and disposed to form an alley-way upon one side of the group and an aisle upon the opposite side thereof, an air conduit extending longitudinally within said alley-way and arranged above said floor which is common to the bins, alley-way and aisle, said air conduit tapering longitudinally and decreasing in diameter toward its discharge end, a platform arranged above the air conduit, discharge pipes leading into the bins and connected with said air conduit and arranged above said floor, valves in said discharge pipes and being accessible within the alley-way, and means for supplying air into and through the air conduit.

6. In apparatus of the character described, a house having a floor, a group of bins in the house above the floor, and disposed to form an alley-way upon one side of the group, an air conduit extending longitudinally within the alley-way and arranged above the floor, said air conduit tapering longitudinally and decreasing in diameter toward its discharge end, discharge pipes connected with the air conduit and leading into said bins, slide valves in said discharge conduits, and a platform arranged above said air conduit and having openings formed therein, said openings providing access to said slide valves.

7. In a curing house having bins arranged in rows with aisles therebetween and alley-ways in rear of the bins, the combination with means for supplying tempered air, of conduits connected with said supply means and reducing in diameter in direction of the travel of the air therethrough, said conduits being located in the alley-ways, bin supply pipes leading from the conduits into the bins, nozzles in the bins connected with the supply pipes, valves in the supply pipes accessible from the alley-ways, aisle warming pipes leading from the conduits to the aisles, valves controlling the passage of air from the warming pipes, the conduits and pipes being laid on the floor, platforms over the conduits, and housing within the bins over the pipes.

8. In apparatus of the character described, a house having a floor, a group of bins arranged within the house above the floor, disposed to form an aisle upon one side of said group, an air conduit extending longitudinally of the group and arranged above the floor, discharge pipes connected with the air conduit and leading into said bins, valves in the discharge pipes, aisle warming pipes leading into said aisle and connected with the air conduit, valves in the aisle warming pipes and being adjustable independently of the first named valves, a blower connected with said air conduit, and an air heater connected with the blower and adapted to supply tempered air to the blower.

9. In apparatus of the character described, a house having a floor, a group of bins arranged within the house above the floor, disposed to form an aisle upon one side of said group, an air conduit extending longitudinally of the group and arranged above the floor, a platform extending longitudinally above the air conduit, discharge pipes connected with the air conduit and leading into said bins, aisle warming pipes leading into the aisle and connected with the air conduit, and means for supplying tempered air into the air conduit.

In testimony whereof we affix our signatures.

ROBERT B. VAUGHAN.
RALPH M. LOVE.